Aug. 1, 1944.  R. A. PATTERSON  2,354,926
VALVE LUBRICATION SYSTEM
Filed Nov. 17, 1941
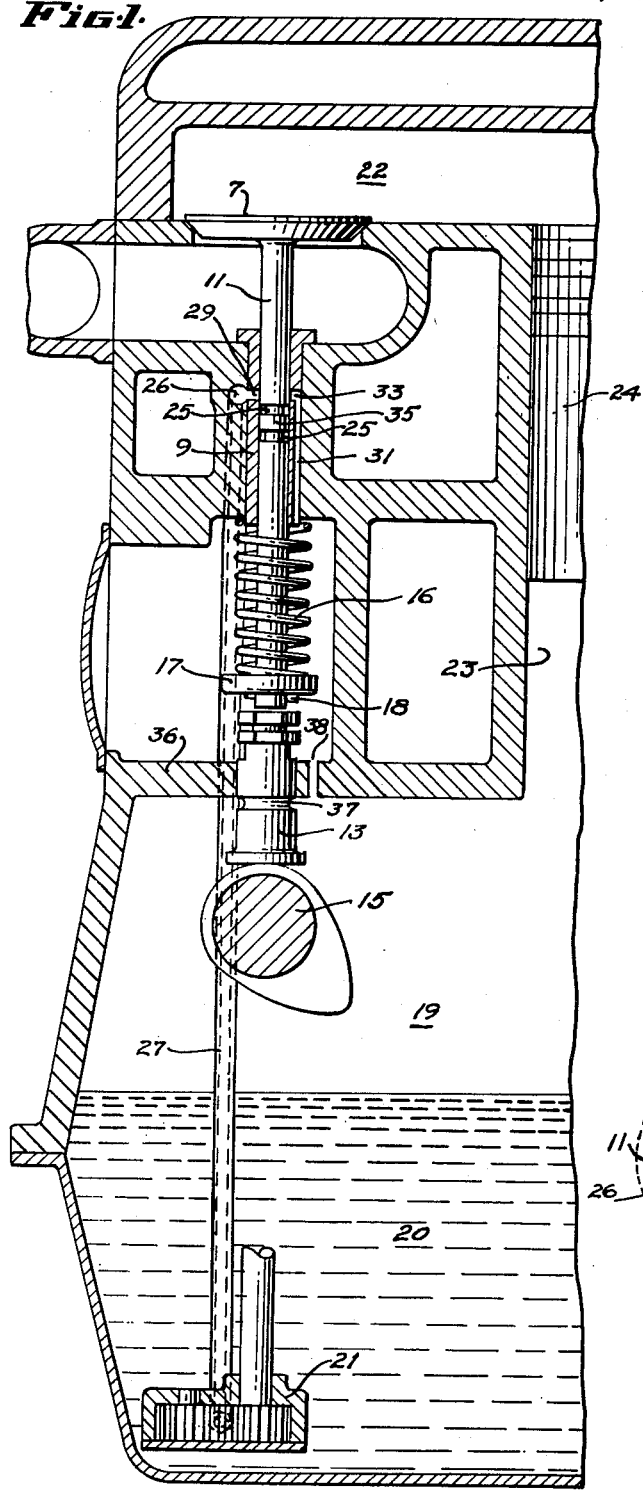
Fig.1.
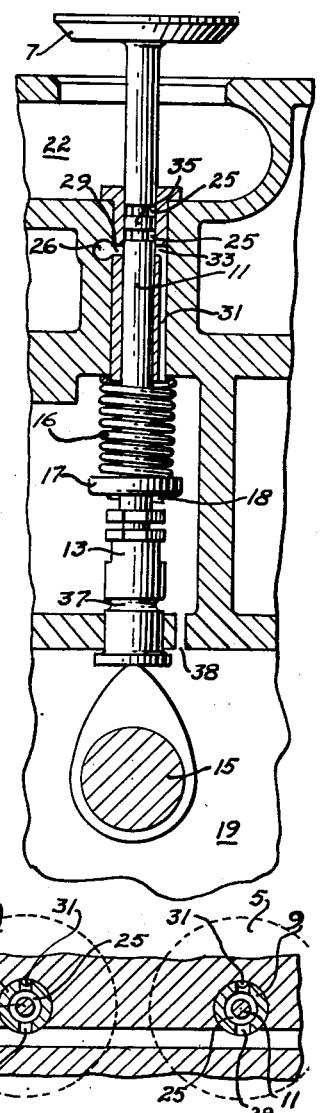
Fig.2.
Fig.3.
INVENTOR.
RAYMOND A. PATTERSON
BY Charles O. Bruce
ATTORNEYS.

Patented Aug. 1, 1944

2,354,926

UNITED STATES PATENT OFFICE 2,354,926

VALVE LUBRICATION SYSTEM

Raymond A. Patterson, Albany, Calif.

Application November 17, 1941, Serial No. 419,413

4 Claims. (Cl. 184—6)

My invention relates to internal combustion engines, and more particularly to a valve and valve lubrication system for an engine of that type.

Among the objects of my invention are to provide a novel and improved valve and valve lubrication system for an internal combustion engine—

(1) Wherein the valve is self-lubricating and is automatically cooled by the lubricating fluid at locations of greatest heat concentration, (2) Wherein the oil supply system of an engine is employed as the source of lubricant for supplying the valve lubrication system, (3) Wherein frequent changes of lubricant to the valve assembly will be assured, (4) Wherein the lubricant to the valves may be supplied thereto under pressure and without appreciably affecting the normal pressure of lubrication to other parts of the engine, (5) Wherein the displaced lubricant is caused to lubricate and cushion the valve tappets and thereby render the operation of the tappets silent, and (6) Wherein the changes necessary in a conventional engine, to incorporate my invention, are small and practical.

Additional objects of my invention will be brought out in the following description of the same taken in conjunction with the accompanying drawing wherein—

Figure 1 is a fragmentary cross-sectional view of a conventional engine block and head, showing my improved valve and valve lubrication system in its relationship to other cooperating parts of the engine, the valve being illustrated in its closed position;

Figure 2 is a view similar to that of Figure 1 but more fragmentary in nature, and showing the valve in its open position;

Figure 3 is a horizontal fragmentary view, longitudinally of the engine block, showing a pair of valves and their relationship to the lubrication feed line.

A conventional type of engine block provides for the reception of a pair of valves, to a cylinder, one constituting the intake valve 5, and the other, the exhaust valve 7. These valves are preferably reciprocally mounted in valve guides or sleeves 9, the valve stems 11 extending below the bottom of the sleeves. Below the extended end of each valve stem, there is a tappet 13 for engagement with the cam shaft 15 of the engine. A valve spring 16 surrounding the stem and bearing against a loosely mounted spring-retaining cup 17, supported by a key 18 through the valve stem, serves to assure a quick return stroke of the valve. The cam shaft functions to sequentially reciprocate the valves in proper timed relationship to the strokes of their associated pistons. It is usually located in the crankcase 19 of the engine, which serves as the reservoir for the lubricant 20. Parts of the engine requiring lubrication may be supplied from the reservoir under pressure, by a suitable oil pump 21 and a force feed lubrication system.

Each valve controls a passage 22 to an associated cylinder 23 in which is reciprocally supported a piston 24. The passage 22 may be either an intake or exhaust passage, depending upon which valve controls the same.

My invention is intended primarily for the exhaust valves which are exposed to the hot gases and products of combustion exhausted from the cylinder, although the same is also applicable to advantage to the intake valves.

With reference to the exhaust valves, the upper portion of the valve stem and valve sleeve develop the highest temperatures by reason of the fact that these portions are directly exposed to the exhaust gases and products of combustion.

In accordance with the broad principles of my invention, I provide on each valve stem, one or more peripheral oil-receiving grooves 25, which, upon reciprocation of the valve in response to operation of the cam shaft, will serve to spread a copious supply of oil over that portion, in particular, of the bearing surface in which the greatest heat concentration would normally develop.

A complete change of lubricant in each of these groove reservoirs is caused to occur twice during each reciprocation of the valve, whereby the oil, which has, during the previous up-stroke, been exposed to the high temperatures, is completely displaced by a supply of fresh cool oil on the down-stroke, and a similar change occurs on the up-stroke. This repeated displacement of hot oil with cool lubricant serves not only to maintain proper lubrication of the valve at the location where it is most needed, but at the same time functions as a cooling medium to assist the customary water jacket in holding the temperature of the valve assembly down to a reasonable value.

To obtain the periodic replenishment of lubricant in the oil grooves of the stem, I provide a longitudinal oil supply channel 26 through the block, one end of which is closed while the other end is connected to an oil supply line 27 leading preferably from the oil pump 21 of the engine.

Each of the valve sleeves is provided with a side opening 29 in registry with the longitudinal channel 26 to provide a flow path for the lubricant to the bearing surface of the sleeve.

A discharge groove 31 is formed in the outer surface of the sleeve, and passes at its upper end through the wall of the sleeve at a point 33 substantially diametrically opposite the side opening 29 in the sleeve, while the other end of the groove terminates at the bottom of the valve sleeve, from where, the oil may drop to the valve spring supporting cup 17 and from there be guided to the tappet below by the valve stem. Thus, the arrangement will always assure an oil cushion between the tappet and the end of the valve stem.

With respect to the specific embodiment of my invention which I have disclosed, the valve stem is provided with a pair of grooves 25 to serve as oil reservoirs during reciprocation of the valve, and with respect to the side opening 29 in the sleeve, these grooves are preferably spaced by a section 35 of the valve stem of full diameter, the length of which section is preferably less than the stroke of the valve. The grooves are so located that both of them must pass to either side of the side opening during reciprocation, whereby each groove, as it crosses the side opening, will be exposed to the lubricant under pressure of the pump 21, and the contents of the groove during such passing will be replaced by fresh lubricant, the displaced lubricant discharging down the groove 31 and dropping by gravity upon the tappet 13.

The tappet 13 may be guided in its reciprocating movement by a partition wall 36, in which case, the tappet will preferably be provided with an oil groove 37 to lubricate the bearing surface of the partition wall, and the partition wall will be perforated as at 38 to permit free passage of the lubricant back to the crankcase.

The spacing section 35 of the stem functions as a cut-off or valve, to block the flow of lubricant from the feed channel 26 during movement of this spacing section across the opening. This fact is of considerable importance when considered in the light of the timed operation of one valve with that of another, for in as much as the valves of an engine do not open and close simultaneously, but at timed intervals, all of the valves will not be receiving oil from the oil channel at the same time. This enables the oil pump to maintain a proper pressure level in the lubrication system of the engine.

Were the valve stems so formed that a discharge from the oil channel was continuous as to each valve, then it will be apparent that all of the valves, regardless of their sequentially timed operation, would be receiving a continuous supply of lubricant from the oil channel, and the supply to all the valves would be simultaneous, from which it would necessarily follow that the pressure in the lubrication system would have to drop to an appreciably lower value, and this would impair proper lubrication to other functioning parts of the engine.

In accordance with my improved system, however, an efficient pressure level is maintained, and the valve lubrication is concentrated for the most part in that region of the valve assembly where it will do the most good.

Lubrication of the lower portion of the valve stem is not as vital to proper operation as lubrication at the upper end. In the absence of any special provisions, sufficient lubrication of the lower portion of the stem will be derived from such slight film of oil or lubricant as will in the normal course of time, appear along the lower regions of the valve stem, although it will be noted that a substantial portion of the bearing surface below the side opening will receive direct lubrication from the oil groove reservoirs. If desired, an oil groove or grooves may be formed in the lower portion of the stem to be fed in a manner similar to the upper oil grooves.

Accordingly, in the above detailed description of a preferred embodiment of my invention, it is noted that the same will fulfill all the objects of my invention as set forth previously, and while I have disclosed but one embodiment, in detail, it is apparent that various modifications may be resorted to, without departing from the principles broadly outlined by me. Therefore, I do not desire to be limited in my protection to the specific details disclosed, except as may be necessitated by the appended claims.

I claim:

1. A valve lubrication system comprising a reservoir for lubricant; a channel for the flow of said lubricant, connecting from said reservoir; a pump for pumping lubricant under pressure from said reservoir into said channel; a plurality of valve assemblies, each of said assemblies including a valve sleeve having a side opening connecting into said channel, and a valve having a valve stem slidably supported in said sleeve; means for sequentially reciprocating said valves in their respective valve sleeves; and means for distributing lubricant to the bearing surface of each of said sleeves, said means including a plurality of independent, unconnected peripheral grooves in each valve stem spaced from each other a distance less than the stroke of each valve and located for passage across said side opening during each stroke of such valve.

2. A valve lubrication system comprising a reservoir for lubricant; a channel for the flow of said lubricant, connecting from said reservoir; a pump for pumping lubricant under pressure from said reservoir into said channel; a plurality of valve assemblies, each of said assemblies including a valve sleeve having a side opening connecting into said channel, and a valve having a valve stem slidably supported in said sleeve; means for sequentially reciprocating said valves in their respective valve sleeves; and means for distributing lubricant to the bearing surface of each of said sleeves, said means including a plurality of independent peripheral grooves in each valve stem spaced from each other by a stem section of full diameter, the length of which is less than the stroke of its associated valve, said stem section being located for movement across said sleeve opening during a stroke of such valve to effect cut-off of flow of said lubricant to said valve during such movement.

3. A valve lubrication system comprising a reservoir for lubricant; a channel for the flow of said lubricant, connecting from said reservoir; a pump for pumping lubricant under pressure from said reservoir into said channel; a plurality of valve assemblies, each of said assemblies including a valve sleeve having a side opening connecting into said channel and a groove in the outer surface of said sleeve passing at one end through the wall of said sleeve at a point substantially diametrically opposite said side opening and terminating with its other end at the lower edge of said sleeve, and a valve having a valve stem slidably supported in said sleeve; means for sequentially reciprocating said valves in their respective valve sleeves comprising a cam shaft supported below said valves and in line with the gravity discharge of lubricant from said groove; and means for intermittently distributing lubricant to the bearing surface of each of said sleeves, said means including at least one peripheral groove in each valve stem located for movement across said side opening in an associated sleeve, the stem portions bounding said groove being of full diameter to effect cut-off of flow of said lubricant to said valve following passage of said groove across said side opening.

4. A valve lubrication system comprising a reservoir for lubricant; a channel for the flow of said lubricant, connecting from said reservoir; a pump for pumping lubricant under pressure from said reservoir into said channel; a plurality of valve assemblies, each of said assemblies including a valve sleeve having a side opening connecting into said channel, and a valve having a valve stem slidably supported in said sleeve; means for sequentially reciprocating said valves in their respective valve sleeves; and means for distributing lubricant to the bearing surface of each of said sleeves, said means including a plurality of independent peripheral grooves in each valve stem spaced from each other a distance less than the stroke of each valve and located to one side of a sleeve opening, at the termination of a stroke of such valve, a tappet disposed below the end of each valve stem, and means for periodically discharging lubricant from said grooves onto said tappets to provide and maintain oil cushions between said tappets and said valve stems.

RAYMOND A. PATTERSON.